(12) United States Patent
Aleksander et al.

(10) Patent No.: US 10,754,848 B2
(45) Date of Patent: Aug. 25, 2020

(54) METHOD FOR REGISTRATION OF DATA IN A BLOCKCHAIN DATABASE AND A METHOD FOR VERIFYING DATA

(71) Applicant: Coinfirm Blockchain Lab Sp. Zo.o., Torun (PL)

(72) Inventors: Pawel Zygmunt Aleksander, Kobylniki (PL); Marcin Jozef Rabenda, Roznow (PL); Pawel Kuskowski, Golub-Dobrzyn (PL); Jakub Fijolek, Bydgoszcz (PL)

(73) Assignee: COINFIRM BLOCKCHAIN LAB SP. Z O.O., Torun (PL)

( * ) Notice: Subject to any disclaimer, the term of this patent is extended or adjusted under 35 U.S.C. 154(b) by 261 days.

(21) Appl. No.: 16/103,916

(22) Filed: Aug. 14, 2018

(65) Prior Publication Data
US 2019/0377811 A1    Dec. 12, 2019

(30) Foreign Application Priority Data

Jun. 7, 2018    (EP) ..................... 18461565

(51) Int. Cl.
*G06F 16/23*    (2019.01)
*G06F 9/46*    (2006.01)
(Continued)

(52) U.S. Cl.
CPC .......... *G06F 16/2365* (2019.01); *G06F 9/466* (2013.01); *G06F 16/2379* (2019.01);
(Continued)

(58) Field of Classification Search
CPC .. G06F 16/2365; G06F 16/2379; G06F 9/466; H04L 9/0637; H04L 9/0643; H04L 9/30
(Continued)

(56) References Cited

U.S. PATENT DOCUMENTS

| 10,417,188 B2 * | 9/2019 | King ..................... G06F 16/137 |
| 2008/0247470 A1 * | 10/2008 | Wang ..................... H04L 1/006 375/241 |

(Continued)

OTHER PUBLICATIONS

Pasquale Forte et al., "Beyond Bitcoin—Part I: A critical look at blockchain-based systems", International Association for Cryptologic Research, vol. 20151202:213043, Dec. 1, 2015, pp. 1-34.
(Continued)

*Primary Examiner* — Hares Jami
(74) *Attorney, Agent, or Firm* — Masuvalley & Partners (57) ABSTRACT

The invention comprises a method for registration of data in a blockchain database, in which database transactions are constructed of standard data containers which may have a fixed size, in a system comprising one or more storage nodes for storing at least part of the blockchain database, one or more approval nodes for approving transactions in said blockchain database and a first computer for generating transactions in said blockchain database, said computer having access to said blockchain database and having access to a first private key. The invention further comprises a method for verifying data based on the aforementioned method for registration and a computer program product comprising program code stored on a computer readable medium, said program code comprising computer instructions for performing the method.

13 Claims, 1 Drawing Sheet

(51) Int. Cl.
  *H04L 9/06* (2006.01)
  *H04L 9/30* (2006.01)
(52) U.S. Cl.
  CPC .......... *H04L 9/0637* (2013.01); *H04L 9/0643* (2013.01); *H04L 9/30* (2013.01)
(58) Field of Classification Search
  USPC ........ 707/687, 703, 790–792, 796, 802, 803
  See application file for complete search history.

(56) References Cited

U.S. PATENT DOCUMENTS

| | | | |
|---|---|---|---|
| 2013/0086149 A1* | 4/2013 | Shi | G06F 16/1865 709/203 |
| 2016/0283920 A1 | 9/2016 | Fisher et al. | |
| 2018/0139056 A1* | 5/2018 | Imai | H04L 9/3236 |
| 2018/0349572 A1* | 12/2018 | Chen | G06Q 30/018 |
| 2019/0266178 A1* | 8/2019 | Madhavan | G06F 16/2365 |
| 2020/0151714 A1* | 5/2020 | Chan | G06Q 20/06 |

OTHER PUBLICATIONS

Bela Gipp et al., "CryptSubmit: Introducing Securely Timestamped Manuscript Submission and Peer Review Feedback using the Blockchain", 2017 ACM/IEE Joint Conference on Ditigal Libraries (JCDL), IEEE, Jun. 19, 2017, pp.1-4.

Zheng Peilin et al., "A Detailed and Real-time Performance Monitoring Framework for Blockchain Systems", 2018 IEEE/ACM 40th International Conference on Software Engineering: Sofware Engineering in Practice Track (ICSE-SEIP), ACM, May 25, 2018, pp. 134-143.

ISA/EP, International Search Report dated Jan. 31, 2019 for International Patent Application No. PCT/EP2018/069221, 6 pages.

ISA/EP, Written Opinion of the International Searching Authority dated Jan. 31, 2019 for International Patent Application No. PCT/EP2018/069221, 12 pages.

* cited by examiner

METHOD FOR REGISTRATION OF DATA IN A BLOCKCHAIN DATABASE AND A METHOD FOR VERIFYING DATA

RELATED APPLICATIONS

This application claims priority to European Patent Application No. EP18461565.6, filed Jun. 7, 2018, entitled A Method For Registration Of Data In A Blockchain Database And A Method For Verifying Data, which is incorporated herein by reference in its entirety.

FIELD OF THE INVENTION

The invention generally relates to data registration and verification methods, in particular, to a method for registration of data in a database in accordance with the blockchain standard and verifying the origin, contents and time stamp of registration of data. The present invention further relates to a computer readable storage medium comprising computer program code instructions for implementing the method.

BACKGROUND

A telecommunication system configured for storing and exchanging data between device operatively connected to the peer-to-peer telecommunications system is described in WO2018032890A1 document, which discloses a method and system for distributing a digital content. The method comprises: a content device receiving a download request sent by a download client, the download request comprising an upload transaction ID and a license transaction ID of a content file to be downloaded; the content device determining, according to the upload transaction ID and the license transaction ID, whether the download client has license information for downloading the content file, and if so, sending the content file to the download client; after the content file has been distributed, the content device sending a download transaction request to a content transaction processing device, the download transaction request comprising download information; the content transaction processing device receiving the download transaction request, determining that the download information is valid, generating a download transaction, and sending the download transaction to a blockchain processing device; and the blockchain processing device receiving the download transaction, and adding the download transaction to a blockchain. The content device sends a content file to a download client only when the download client has download authorization, thereby limiting a distribution range of a content file. In the embodiment of the present invention, there are multiple copyright management or content distribution processes, such as uploading and downloading of content files, licensing, and the like.

Document US20160283920A1 discloses A method for authenticating a chain of custody utilizing blockchain technology, whereby digital evidence or other digital content is acquired and then hashed to produce a hash fingerprint/signature and then immediately or instantly submitting said hash fingerprint/signature to the blockchain using the blockchain network protocol, forming an immediate verifiable chain of custody without human interaction or requiring a trusted third party. According to US20160283920A1, a hash of a document is stored in a blockchain database, thereby allowing for future verification of the content of this document. However, the information about the origin/owner of the document and about relevant moment in time, when said content of the document was hashed (timestamp) is missing in this solution.

A copyright authorisation management method and system is described in WO2018024062A1. The method comprises: obtaining information of a copyright owner; sending a contract determination notification to a corresponding copyright owner client according to the information of the copyright owner, the contract determination notification carrying copyright related information of an authorised work; receiving transaction information returned by the copyright owner client, the transaction information including contract information determined by the copyright owner according to the copyright related information; obtaining an effective contract transaction according to the transaction information, the effective contract transaction including a signature satisfying a preset number of rules; persisting the effective contract transaction in a blockchain. The copyright authorisation management method and system implement the online signing of contracts and the persistence of signed contracts on the basis of blockchains, thereby increasing copyright authorisation efficiency, and ensuring that contracts are unique, trustworthy and tamper-proof.

None of the prior art solutions provides a reliable method for certifying at the same time information about the contents of data, information about the origin/owner of the data and information about the timestamp of registration of the data with this contents from this origin/owner.

SUMMARY

The present invention provides a method for registration data, which allows to securely store in a blockchain database at the same time information about the contents of data, information about the origin/owner of the data and information about the timestamp of registration of data of this contents from this origin/owner. The invention also provides a data verification method, based on this secure data registration method, allowing for verification of data file with respect to the contents, origin/owner and timestamp of registration. The methods are carried out in a telecommunication system configured for registration and exchanging data between devices connected to the telecommunication system.

A telecommunication system configured for registration and exchanging data between devices connected to the telecommunications system can be formed by at least two nodes of said telecommunication system. Said node of the communication system is a telecommunication device e.g. computer, configured for computing data operations e.g. for storing, exchanging, processing. A frontend device, typically a user equipment, is a first computer device with a user interface configured for user data processing, like creating, copying, receiving or sending data in form of digital files (throughout this document called also "digital documents", "digital good", "data" or "test digital documents", "test digital good", "test data"). Said first computer is connected to one or more nodes of the telecommunications system configured for storing data and said first computer is connected to one or more approval node configured for processing data. Nodes configured for storing data and for processing data may be (but do not have to be) the same nodes. Said database is configured for adding new information in a form of a record to existing records, without deleting or overwriting any previous records. This is a so-called incremental and immutable database. The well-known blockchain database is an example of such a database. Each record is a data packet having its size and structure (in many Blockchain standards: a fixed size and a fixed structure), records are stored in transactions, transactions are stored in blocks and database made from blocks forms a blockchain. Said block contains so-called transactions generated by the computer, timestamp and information about the preceding block in the blockchain. Said transaction contains integer number of data containers, which—in many Blockchain standards—have their standard, fixed size. Specifically, in Blockchain standards such as Bitcoin or Dash the standard data container has its standard, fixed size.

The blockchain is a digitized, decentralized, ledger of all transactions. Constantly growing as 'completed' blocks (the most recent transactions) are recorded and added to it in a chronological order, it allows market participants to keep track of transactions without central recordkeeping. Any node (a computer connected to the network) may get a copy of the blockchain, which is downloaded automatically. The network synchronizes the content of the database between the nodes so that each node possesses the same information encompassing all completed blocks.

Originally developed as the accounting method for the virtual currency Bitcoin, blockchains—which use what's known as distributed ledger technology (DLT)—are appearing in a variety of commercial applications today. Currently, the technology is primarily used to verify transactions, within digital currencies though it is possible to digitize, code and insert practically any data into the blockchain. Doing so creates immutable records that "practically" cannot be changed. Furthermore, the record's authenticity can be verified by the entire community using the blockchain instead of a single centralized authority.

A block is a part of the blockchain, which records at least part of the recent transactions. Sometimes a block may be empty—despite transactions awaiting to be recorded. Once completed, the block is permanently recorded into the blockchain. Each time a block gets completed, a new one is generated and awaits for completion (cryptographic approval of its contents) by network nodes. The number of blocks constantly increases over time. Blocks are connected to each other (like links in a chain) in proper linear, chronological order. Every block contains a hash of the previous block. The blockchain has complete information about all transactions right from the genesis block to the most recently completed block.

The blockchain was designed so that these transactions are immutable, meaning they cannot be deleted or changed. The blocks are added through cryptography, ensuring that they remain meddle-proof: the data can be distributed, copied, but not altered. However, the ever-growing size of the blockchain is considered by some to be a problem, creating issues of storage and synchronization.

[http://scet.berkeley.edu/wp-content/uploads/AIR-2016-Blockchain.pdf]

According to the invention, a method for registration of data in a blockchain database, in which database transactions are constructed of standard data containers which may have a fixed size, in a system comprising one or more storage nodes for storing at least part of the blockchain database, one or more approval nodes for approving transactions in said blockchain database and a first computer for generating transactions in said blockchain database, said computer having access to said blockchain database and having access to a first private key, comprising the following steps:

a) providing a first set of data, relating the contents of a digital file;

b) providing a second set of data, relating to the origin of said digital file;

c) generating a third set of data by merging a header, the first set of data, the second set of data and optionally a suffix into a data frame, starting with the header, followed by the first set of data, followed by the second set of data and optionally ending with the suffix, wherein the header contains information about the size of the first set of data, while the size of the suffix is adjusted such that the size of the data frame is a multiple of the size of the standard data container used in said blockchain database;

d) dividing the third set of data into an integer number N of parts of equal size, said size corresponding to the size of the standard data container used in said blockchain database;

e) generating—by said first computer or an intermediary computer connected to the first computer and said one or more of the approval nodes—a single blockchain database transaction for all the N parts obtained in the step d), signing the transaction by said first private key and sending (directly or indirectly) the transaction and a first public key matching the said first private key to said one or more of the approval nodes for approval;

f) obtaining approval for the transaction from said one or more of the approval nodes;

g) registering the transaction approved in the step f) in a block of the blockchain database with the timestamp of registration by the one or more storage nodes.

In one preferred embodiment, the first set of data is the digital file.

In another preferred embodiment, the first set of data is a hash of the digital file, preferably generated by SHA256 algorithm, SHA3-256 algorithm, or a SHA3-512 algorithm.

In such case (i.e. when the first set of data is a hash of the digital file), the first set of data is a hash of the digital file generated by the SHA256 algorithm and has the size of 64 digits, preferably 64 hex digits or a multiple thereof or is a hash of the digital file generated by the SHA3-256 algorithm and has the size of 64 digits, preferably 64 hex digits or a multiple thereof, or is a hash of the digital file generated by the SHA3-512 algorithm and has the size of 128 digits, preferably 128 hex digits or a multiple thereof.

Preferably, the second set of data comprises a digital signature of the digital file, preferably calculated as a function of: the hash of the digital file, a private key corresponding to the origin of the digital file and optionally a public key corresponding to said private key.

In such case, the second set of data preferably has the size of 130 digits, preferably 130 hex digits.

Preferably, the header has the size of 6 digits, preferably 6 hex digits and comprises the following information: version of the digital file, type of the digital file, the number of hashes that should be stored in said data frame, number of signatories of the digital file.

Preferably, the blockchain database is a Dash database or a Bitcoin database, and the standard data container has the size of 40 hex digits.

Preferably, the following information is stored in a separate database, in relation to the first set of data: the transaction hash corresponding to the transaction generated in the step e), the block hash, the block height and the block timestamp of registration, corresponding to the block mentioned in the step g).

The invention also relates to a method for verifying data comprising the following steps:

h1) providing a test digital file by a user, preferably through a web browser;

i1) calculating the hash of the test digital file;

j1) checking if the hash of the test digital file matches the first set of data being a hash of the digital file, previously stored in the block of the blockchain database as the result of the method according to any one of the claims 3 to 8, and in the affirmative sending confirmation to the user, preferably through the web browser, said confirmation comprising information relating to the contents of the test digital file and optionally comprising information relating to the origin of the test digital file and/or information relating to the timestamp of registration of the block.

The invention also relates to a method for verifying data comprising the following steps:

h2) providing a test digital file by a user, preferably through a web browser;

i2) calculating the hash of the test digital file;

j2) checking if the hash of the test digital file matches the first set of data being a hash of the digital file, previously stored in said separate database as the result of the method according to claim 9, and in the affirmative sending confirmation to the user, preferably through the web browser, said confirmation comprising information relating to the contents of the test digital file and optionally comprising information relating to the origin of the test digital file and/or information relating to the block timestamp of registration.

Preferably, if the hash of the test digital file matches more than one first sets of data in the step j1) or j2) respectively, then only information corresponding to the transaction bearing one selected timestamp of registration, preferably the oldest timestamp of registration is used as the basis to generate the confirmation to the user in the step j1) or j2) respectively.

The invention also relates to a computer program product comprising program code stored on a computer readable medium, said program code comprising computer instructions for performing the methods defined above.

DETAILED DESCRIPTION

The present invention proposes a method for registration of data in a blockchain database. As mentioned before, the blockchain database is a commonly known example of an incremental database, in which transactions are constructed of standard data containers which may have a fixed size. The blockchain database is known to be implemented in a system comprising one or more storage nodes for storing at least part of the blockchain database and one or more approval nodes approving transactions in said blockchain database (commonly referred to as "miners"). Nodes configured for storing data and for processing data may be (but do not have to be) the same nodes. Also, there is a computer for generating transactions in the blockchain database, said computer having access to said blockchain database and nodes. This computer also has access to a private key of the system operator (a first private key, or node's private key).

Figure 1:
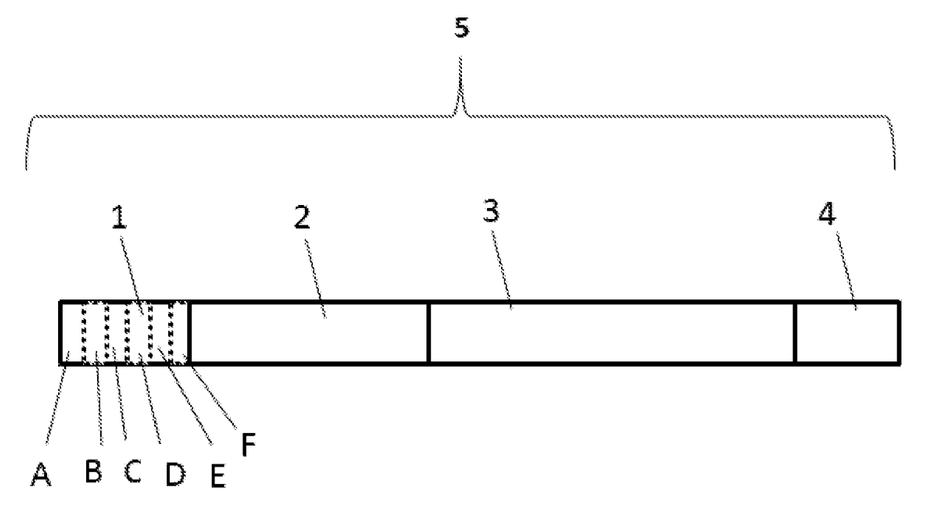
FIG. 1 shows a third set of data according to a preferred embodiment of the invention, in which case the third set of data 5 is a data frame comprising a header 1, a first set of data 2, a second set of data 3 and a suffix 4, wherein the header 1 further comprises the first digit (A), containing information about the version of the digital file, the second digit (B), relating to a type of the data, the third (C) and the fourth digits (D), containing information about the number of hashes that should be stored in this frame, the fifth digit (E), informing about the number of digital file owners and the sixth digit (F), for storing some additional information not relevant in this embodiment.

The Inventive Method Comprises the Following Steps:

a) Providing a first set of data 2, relating the contents of a digital file. The term "digital file" encompasses any "digital good", i.e. it can be a data file with a well-established data structure, such as a file of one of standard formats (e.g. pdf, doc, mp3, avi, jpeg etc.) or any other set or string of data. The term "first set of data relating to the contents of the digital file" encompasses information related to the contents of the digital file. It can be in particular the digital file itself, a part of it or a hash of this digital file, said hash being obtained by any known method (details of hash functions are discussed further in text).

b) Providing a second set of data 3, relating to the origin of said digital file. The origin refers to a source of the file, e.g. IP address of a node, blockchain address, ID or name of a user who is the author or the owner of said digital file. The second set of data 3 comprises a digital signature of the digital file, preferably calculated as a function of: the hash of the digital file, a private key corresponding to the origin of the digital file (a second private key, i.e. a private key of the owner of the digital file), and optionally a public key corresponding to said second private key. The size of the second set of data 3 is related to how much information it stores, how long the hash of the digital file is and how many hashes it stores, how long the digital signature is and how many digital signatures it stores. For example, using the SHA3-256 hash function—the hash will be 64 digits long and using the SHA3-512—it will be 128 digits long.

c) generating a third set of data 5 by merging the two previously mentioned data sets (i.e. the first set of data 2 and the second set of data 3) and adding a header 1 and optionally a suffix 4. The third set of data 5 is a data frame with the header 1, the first set of data 2, the second set of data 3 and the suffix 4. This means that the third set of data 5 has a structure: namely it starts with the header 1, followed by the first set of data 2, followed by the second set of data 3 and ends with the suffix 4, if necessary. The header 1 has 6 hex digits, wherein the first digit (A) contains information about the version of the digital file, the second digit (B) relates to the type of the digital file, the third (C) and fourth digits (D) contain information about the number of hashes that should be stored in this frame, the fifth digit (E) informs about number of digital file owners and the sixth digit (F) is for registration some additional information, not relevant in this embodiment. The suffix 4 is added to the data frame to make it possible to divide the data frame (i.e. the third set of data 5) into an integer number of parts of equal size. Thus, the size of the suffix 4 is adjusted such that the total size of the data frame (i.e. of the third set of data 5) is a multiple of the size of the standard data container used in said blockchain database. For example, in the bitcoin database the container has 40 digits, so the frame size must be a multiple of 40, e.g. must be equal to 40, 80, 120 etc. The contents of the suffix 4 is not relevant in the present embodiment (by way of example it may be in the form of zeros or digits, or strings).

For example, generating such a data frame in a bitcoin blockchain database is carried out as follows: In this embodiment the aforementioned third set of data 5 is a data frame having the following parts: 6 digits header 1+64 digits hash as the first set of data 2+130 digits digital signature as the second set of data 3, which gives 200 digits, 200 is a multiple of 40 (standard bitcoin container size), so there is no need to add a suffix 4.

In another embodiment, for a hash calculated using SHA3-512 algorithm, the third set of data 5 is a data frame having the following parts: 6 digits header 1+128 digits hash as the first set of data 2+130 digits digital signature as the second set of data 3, which gives 264 digits, which is not a multiple of 40 (standard bitcoin container size), so the suffix 4 needs to be added and must have the size of 16 digits. In this embodiment the suffix 4 is a string of data. In this operation 280 digits-long frame, which is a multiple of 40, is generated as the third set of data 5. For this third set of data 5 the number N of integer parts of the size of the standard container for bitcoin blockchain is 7.

d) dividing the third set of data 5 into the integer number N of parts of equal size, said size corresponding to the size of the standard data container (corresponding to the blockchain database). As it was mentioned above, the third set of data 5 is then divided to an integer number of parts, having a fixed, equal size. The size results from the type of the blockchain data base. For Bitcoin and Dash blockchain databases the standard container size is 40 digits. In the aforementioned embodiments the third set of data 5 is divided:

in the first embodiment—into N=5 parts of 40 digits,
in the second embodiment—in to N=7 parts of 40 digits.

e) generating—by said first computer or an intermediary computer connected to the first computer and said one or more of the approval nodes—a single blockchain transaction for all the N parts obtained in the step d), signing the transaction by said first private key and sending the transaction and a first public key matching the said first private key to said one or more of the approval nodes for approval. Said generating of the transaction encompasses also a situation in which the transaction is generated by the intermediary computer, which gets the contents needed for generating the transaction from said first computer. Said sending the transaction may be carried out directly (between the first computer and the one or more approval nodes) or indirectly—i.e. from the first computer through API and back-end to the one or more approval nodes. The transaction then propagates in the network as approval nodes are broadcasting it—sharing information with other nodes. Generated transaction is now known to more than one approval node to maximize consensus and security level.

f) obtaining approval for the transaction from said one or more of the approval nodes. Approval nodes send and propagate the approval information to the network.

g) registering the transaction approved in the step f) in a block of the blockchain database with the block creation timestamp (i.e. the timestamp of registration) by the one or more storage nodes. The approved transaction is put into the block of the blockchain database. Information about a new record added to the blockchain (new block) is spread through the network. This way all information about the digital good has been stored in the blockchain database, along with information about its source/origin/owner and a timestamp of registration.

In one embodiment of the method according to the invention, the first set of data 2 is the digital file. The term "digital file" encompasses any "digital good", i.e. it can be a data file with a well-established data structure, such as a file of one of standard formats (e.g. pdf, doc, mp3, avi, jpeg etc.) or any other set or string of data. The term "first set of data 2 relating to the contents of the digital file" encompasses information related to the contents of the digital file. It can be in particular the digital file itself, a part of it or a hash of this digital file, said hash being obtained by any known method (details of hash functions are discussed further in text).

In another embodiment of the method according to the invention, the first set of data 2 is a hash of the digital file, preferably generated by the SHA256 algorithm, SHA3-256 algorithm, or SHA3-512 algorithm. The hash may be generated using any other know cryptographic algorithm, which as an output gives a string of digits. This string of digits is a unique identifier of the digital file, where it is practically impossible to reverse the hashing function and recreate the digital file from the hash. Preferably the hash is generated using an Elliptic Curve Cryptography (ECC), preferably using the Secure Hash Algorithms, which are a family of cryptographic hash functions published by the National Institute of Standards and Technology (NIST) as the U.S. Federal Information Processing Standard (FIPS), including: SHA-0: a retronym applied to the original version of the 160-bit hash function; SHA-1: a 160-bit hash function which resembles the earlier MD5 algorithm; SHA-2: a family of two similar hash functions, with different block sizes, known as SHA-256 and SHA-512; they differ in the word size: SHA-256 uses 32-bit words and SHA-512 uses 64-bit words; there are also truncated versions of each standard, known as SHA-224, SHA-384, SHA-512/224 and SHA-512/256; SHA-3: a hash function formerly called Keccak; it supports the same hash sizes as SHA-2 and its internal structure differs significantly from the rest of the SHA family; the corresponding standards are FIPS PUB 180 (original SHA), FIPS PUB 180-1 (SHA-1), FIPS PUB 180-2 (SHA-1, SHA-256, SHA-384 and SHA-512); NIST has updated Draft FIPS Publication 202, SHA-3 Standard separate from the Secure Hash Standard (SHS).

In the method according to the invention, the second set of data 3 comprises a digital signature of the digital file, preferably calculated as a function of: the hash digital file (or the digital file itself), a private key corresponding to the origin of the digital file (called above the second digital key) and a public key corresponding to said second private key, using one of above mentioned hash functions, preferably generated by SHA256 algorithm, SHA3-256 algorithm, or a SHA3-512 algorithm. Typically, the signature function is a function embodied in a blockchain protocol. The hash may be generated using any other known cryptographic algorithm which as an output gives a string of digits. Details are given in the earlier paragraph. A typical digital signature of a digital file is a function of the hash of this digital file, the private key of the signatory of the digital file and optionally of the public key, corresponding to this private key.

When the second set of data 3 is the digital signature of the digital file, the second set of data 3 has the size of 130 digits, preferably 130 hex digits (128 digits is a digital signature calculated using Elliptic Curve Cryptography, 2 digits is a prefix, added by the calculating node).

In a preferred embodiment of the method according to the invention, the following information is stored in a separate database, in relation to the first set of data 2: transaction hash corresponding to the transaction generated in the step e), block hash, block height and block timestamp of registration, corresponding to the block mentioned in the step g). This data can be stored in a separate database on a server or computer connected permanently or temporary to the blockchain database. Said separate database can be copied or transferred and stored on a separate computer or server. The database can be modified in any possible way, it does not need to be an incremental database like blockchain is. Any operation on a record e.g. copying, writing, deleting, reading, editing, merging etc. may be possible. Said database can also store additional information relating to the digital file (digital good), e.g. file size, file type, file owner, file author, file version, file abstract, file contents, the whole digital good or file etc. The separate database can store additional information about the origin of the digital good, e.g. IP address of the node, blockchain address, ID or name of a user who is the author or the owner of said digital good, number of owners, time of sending to the blockchain, timestamp of registration of the block in the blockchain, blockchain type, etc. Of course, all this information can also be stored in the blockchain database itself. However, the advantage of registration this information in the separate, preferably dedicated, database is the possibility of fast retrieval of this information when information about a particular digital file is sought, for example for the purpose of its verification. Retrieval of information from the dedicated, separate database may be much faster than from the blockchain database. Once retrieved from the separate database, the information may be used to find relevant blocks and transactions in the blockchain database, in which transactions the complete information about the contents and origin of the digital file has been stored, along with relevant timestamp of registration.

Therefore, the present invention proposes a method for for verifying a test digital file, based on the registration method described above. Here "verification" means verification of the contents of the test digital file, verification of the origin of the digital file and the registration timestamp.

According to the invention, first a user provides a test digital file (test document) for verification. Verifying authenticity of the test digital file is carried out by calculating a hash of the test digital file and checking if the hash of the test digital file matches the first set of data 2 being a hash of the digital file, previously registered in the block of the blockchain database as the result of the data registration method described above. In the affirmative, a confirmation is sent to the user, who provided the test digital file. Said confirmation comprises information relating to the contents of the test digital file and optionally comprises information relating to the origin of the test digital file and/or information relating to the timestamp of registration of the block.

In other words, this verification method allows for verifying the following three important features of the test digital file:

WHAT—the contents of the test document.

WHO—the origin/owner of the test digital fie. For example, in the case that Elliptic Curve Cryptography (ECC) is used, in order to establish the owner (i.e. the signatory of the hash of the test document), the owner has to sign any random string with his private key, thereby creating a random string signature. Typically, the signature function is a function embodied in a blockchain protocol. Based on this random string signature one can calculate the public key corresponding to the private key of the owner. This is a known procedure, called Public Key Recovery Operation, described e.g. here: http://www.secg.org/sec1-v2.pdf In the same way, the public key can be calculated as a function of the signature of the hash of the test document. If the thus obtained public keys are identical—it is a confirmation that the same owner has signed both the test digital file and the aforementioned random string (or—more precisely: confirmation that in both cases the same private key was used for signature). Likewise, these public keys may be checked with the public key calculated as a function of the signature of the hash of the digital file, information above has been previously stored in the blockchain database or in the separate database, according to the data registration method of the present invention. This way verification of the owner of the file can be carried out.

WHEN—the timestamp of the registration of the relevant block in the blockchain database is checked and returned.

In a preferred embodiment of the invention, the user provides the test digital file through a web browser (e.g. by dragging and dropping a file to a field in a web form). Likewise, the results of verification procedure (confirmation), as described above, is preferably provided to the user through the web browser. However, other communication means may be used as an alternative or in parallel to the web browser. For example, the user can submit the test file for verification through a web browser and receive verification results by e-mail. Or the user may submit the test file for verification by e-mail and receive verification results by e-mail, etc.

In a preferred alternative embodiment of the verification method according to the present invention, similar steps are performed as described in the earlier paragraph (i.e. a user provides a test digital file for verification and hash of the test file is calculated), but then in the checking step it is checked if the hash of the test digital file matches the first set of data 2 being a hash of the digital file, previously stored in said separate database as the result of the aforementioned data registration method. In the affirmative confirmation is sent to the user, similarly as described in the earlier paragraph.

Verification method in a situation when the hash of the test digital file matches more than one first sets of data in above describe verification process: If the hash of the test digital file matches more than one first sets of data, then only information corresponding to the transaction bearing one selected timestamp is used as the basis to generate the confirmation to the user. In one embodiment said one selected timestamp is the oldest timestamp. This is a preferred option, but other embodiments cannot be excluded, e.g. in which all newest records would also be returned.

The aforementioned method can have a form of a computer program product, comprising program code stored on a computer readable medium, like a memory stick, a CD, a hard drive of a computer or an internet server or as asset of instructions stored on different servers, preferably a web tool product configured to preform said method on a user's computer or on a server having a user interface configured for user operations and a network interface for network connectivity, if necessary.

A preferred embodiment of the methods according to the present invention is described below. It should be understood that modifications of this embodiment are possible— in particular in view of the aforementioned teaching.

Procedure of Registering Data in Blockchain

The process begins with a user uploading data into memory of a user terminal. The data is acted on by the hashing function SHA-256. The SHA-256 is a publicly available algorithm for encoding data. This is a cryptographic hash function, the task of which is to map data of arbitrary size to a bit string of a size corresponding to the size of a standard data container used in this particular Blockchain standard. In some Blockchain standards such as Bitcoin or Dash the standard data container has its standard, fixed size (256 bits which equals to 64 hex characters). The key to producing this 64-character hash is the impossibility of recreating the data from the hash (one-direction operation) and the extreme improbability of any other data resulting in the same hash (collision resistance). After hashing, the data is removed from the memory of the user terminal and only the hash remains in the memory of the user terminal.

Hashing the data is followed by running the procedure of verification of data on blockchain using the hash as an input. If the data is found in the blockchain, the system operator decides whether or not the user is allowed to proceed with registration of data. If the system operator allows the user to continue or the hash was not found in the blockchain, the user is asked if he wants to proceed with recording data in the blockchain.

If the user chooses to continue, the hash of data is signed using user's private key (corresponding to the second private key mentioned earlier). The function of blockchain signature of the hash of the data is the publicly available ECDSA (Elliptic Curve Digital Signature Algorithm) function, corresponding to the keys generation function, that calculates the signature of the hash of the data from the hash of the data and the user's private key. The signature is a 128 hex characters long number and neither the user's private key nor the hash of the data can be calculated from it. The calculated signature is saved in the memory of the user terminal.

Producing the signature is followed by submitting the memory of the user terminal to memory of the system operator computer, using a secure API connection.

The system operator runs the function of checking if the signature of the hash of the data matches the user's public key. It is a publicly available function from the ECDSA family, the inputs of which are: the hash, the signature and the public key. The function reports a message (positive or negative) to the system operator. If it is negative, the message is forwarded to the user.

If the data from the memory of the user terminal is compatible—the system operator moves on to creating a blockchain transaction.

Creating Transaction

Creating the blockchain transaction comprises signing transaction inputs (i.e. unspent outputs of previous transactions) to this address and creating transaction outputs from the provided data and generating transaction script and its hash. It begins with the function of transaction signing and private key saving. This is a publicly available function that is a part of ECDSA. It signs the unspent transaction outputs that the system operator received with a corresponding private key (i.e. the first private key or the node's private key, mentioned earlier).

Signing the inputs is followed by constructing the outputs of the transaction that comprises the data that is intended to be permanently recorded in the blockchain network, which are: the hash of the data, the user's signature, the unique user identifier and public note. This function begins with creating a long string of hexadecimal characters by connecting the following elements: the hash of the data, a separator (e. g. 01), the signature of hash, a separator (e. g. size of following element from 00 to ff), hex notation of the unique user identifier, a separator and lastly hex notation of the data public note. The generated string is afterwards cut into 40 characters (160 bit) long sections and if necessary the last part is supplemented by zeros (or any other hex characters) to obtain the required size. Each of 40 hex character sections is the final hash160 of a fictional non-existent public key that will become the recipient of the currently created transaction.

Having generated the hash160s of outputs, the procedure moves to creating a standard P2PKH transaction script using the system operator's signature and system operator's public keys, corresponding to the previously signed outputs, for the input script and the previously generated hash160 strings for the output script in which each output address receives a minimum allowed amount of cryptocurrency (e.g. for Bitcoin it is 5430 Satoshis Since Bitcoin Core 0.14.1).

The script is acted upon by hash256 function. It is a publicly available algorithm for encoding data. Hash256 is a cryptographic hash function that maps data of arbitrary size to a bit string of a fixed size of 64 hex characters. The generated hash is saved in the memory of system operator.

Adding Transaction to Blockchain

Creating the transaction is followed by registering it in the blockchain. That begins with the function of transaction submitting to blockchain, which sends the previously created transaction script to blockchain nodes.

After a specified time (e.g. 30 minutes) the system operator checks if the transaction has been added to the blockchain by querying the blockchain node if the transaction has been added to recent blocks. If the answer is negative, then the system operator returns to the function of transaction submitting to blockchain. If the transaction has successfully been added to the blockchain, then the transaction details are imported from the blockchain into memory of the system operator computer.

These two sets of data are compared in the function of checking if the data from the blockchain matches the data from the database of the system operator (corresponding to the separate database mentioned earlier). If the function returns a negative message, it can be forwarded to the user. If the outcome of the function is positive (i.e. the data from the blockchain does not match the data from the database of the system operator), the transaction details are submitted to the database of the system operator.

Procedure of Verification of Data in Blockchain

The procedure of verification begins with the user uploading the data to be verified in blockchain. The data provided is acted upon by the hash function SHA-256, the hash of the data is saved while the data itself may be deleted.

Having generated the hash, the procedure moves on to searching for it in the database of the system operator. It is done by running the function of checking if the hash of the data is contained in the database of system operator. It is a function, the task of which is to check if the hash of the data exists in the database. It asks the database if the hash is registered using suitable query. The function either reports a positive message to the user and/or system operator and uploads the data corresponding to the hash that where registered in that database, if the hash is present in the database, or reports a negative message to user and/or system operator otherwise.

If the message reported is positive, then the data assigned to the hash of the data is reported to the memory of the user terminal. Afterwards the user can decide whether or not to proceed with checking if the hash is present in the blockchain block that was specified in the system operator database. If the user decides to continue, the system operator runs the procedure of searching for the hash in specified block and checking integrity of data.

If the procedure returns a positive message, the user can choose to proceed with verification of ownership of the data. Then the procedure of identifying and verifying the owner of the data is called.

If the hash of the data has not been found in the database of the system operator or data in the block specified in that database does not match the data to be verified, the user can decide whether or not to proceed with checking if the hash has ever been registered in the blockchain. If the user chooses to continue, the function of checking if the hash of the data has been added to the blockchain is run. If the hash has been found in the blockchain, the database of the system operator is updated with information about the transactions in which this hash was found in the blockchain and the user can choose to proceed with verification of ownership.

Searching for Hash in Specified Block and Checking Integrity of Data

This procedure begins with function of checking if the hash of the data has been added to a specified blockchain block. It is a function meant to check whether the hash of the data is present in scripts of transactions in the blockchain block that was specified.

The function inputs are: the block details (blockchain identifier, block height and block hash) and the hash of the data.

The function queries the blockchain nodes (of the blockchain specified by the blockchain identifier) for the hashes of all transactions stored in the specified block. For each of received transaction hashes, the function asks for raw transaction script. From such script, hash160s of output public keys are retrieved and connected in order to receive one long hex string. The first n characters are the candidate for the hash of the data (where n is the size of the hash that the hash function generates, e. g. n=64 for SHA-256). If the candidate is equal to the original hash then a positive message is reported and the transaction data (i.e. the hash and it's raw script) in which the hash of the data was found is submitted to the memory of the system operator computer. If none of the candidates matches with the original hash, the function reports a negative message.

If a positive message has been reported, the system operator runs a function of checking if data from the database of the system operator matches with data from the blockchain, which function reports either a positive or negative message.

Function of Checking if Hash of Data has been Added to Blockchain

Function of checking if the hash of the data has ever been added to the blockchain is a function the purpose of which is to determine whether or not the hash has been ever registered in the blockchain. If the hash is found, the function should return the details of the block and transaction hash where the hash of the data is registered, such as e.g. the signature, the public key of the system operator, the public note.

This function's only input is the hash of the data to be verified.

For each blockchain database in which the system operator registers hashes of data, function queries the suitable blockchain nodes for hashes of all blocks. For every obtained block hash, the function queries the nodes for block details (e.g. block hash and block height).

The function proceeds by calling the function of checking if the hash of the data has been added to a specified blockchain block with the arguments: block details (blockchain identifier, block height, block hash) and the hash of the data. If the output is positive and a positive message and transaction data are returned, then the function reports a positive message and block details together with the transaction data. If the function of checking if the hash of the data has been added to a specified blockchain block reports a negative message, it is called for next block. If the hash is not found in any block in any of the blockchain databases, the function of checking if the hash of the data has ever been added to the blockchain reports a negative message.

The invention claimed is:

1. A method for registration of data in a blockchain database, in which database transactions are constructed of standard data containers which may have a fixed size, in a system comprising one or more storage nodes for storing at least part of the blockchain database, one or more approval nodes for approving transactions in said blockchain database and a first computer for generating transactions in said blockchain database, said computer having access to said blockchain database and having access to a first private key, comprising the following steps:
    a) providing a first set of data, relating the contents of a digital file;
    b) providing a second set of data, relating to the origin of said digital file;
    c) generating a third set of data by merging a header, the first set of data, the second set of data and optionally a suffix into a data frame, starting with the header, followed by the first set of data, followed by the second set of data and optionally ending with the suffix, wherein the header contains information about the size of the first set of data, while the size of the suffix is adjusted such that the size of the data frame is a multiple of the size of the standard data container used in said blockchain database;
    d) dividing the third set of data into an integer number N of parts of equal size, said size corresponding to the size of the standard data container used in said blockchain database;
    e) generating—by said first computer or an intermediary computer connected to the first computer and said one or more of the approval nodes—a single blockchain database transaction for all the N parts obtained in the step d), signing the transaction by said first private key and sending the transaction and a first public key matching the said first private key to said one or more of the approval nodes for approval;
    f) obtaining approval for the transaction from said one or more of the approval nodes;
    g) registering the transaction approved in the step f) in a block of the blockchain database with the timestamp of registration by the one or more storage nodes.

2. The method according to claim 1, wherein the first set of data is the digital file.

3. The method according to claim 1, wherein the first set of data is a hash of the digital file, preferably generated by SHA256 algorithm, SHA3-256 algorithm, or a SHA3-512 algorithm.

4. The method according to claim 3, wherein the first set of data is a hash of the digital file generated by the SHA256 algorithm and has the size of 64 digits, preferably 64 hex digits or a multiple thereof or is a hash of the digital file generated by the SHA3-256 algorithm and has the size of 64 digits, preferably 64 hex digits or a multiple thereof, or is a hash of the digital file generated by the SHA3-512 algorithm and has the size of 128 digits, preferably 128 hex digits or a multiple thereof.

5. The method according to claim 1, wherein the second set of data comprises a digital signature of the digital file, preferably calculated as a function of: the hash of the digital file, a private key corresponding to the origin of the digital file and optionally a public key corresponding to said private key.

6. The method according to claim 5, wherein the second set of data has the size of 130 digits, preferably 130 hex digits.

7. The method according to claim 1, wherein the header has the size of 6 digits, preferably 6 hex digits and comprises the following information: version of the digital file, type of the digital file, the number of hashes that should be stored in said data frame, number of signatories of the digital file.

8. The method according to claim 1, wherein the blockchain database is a Dash database or a Bitcoin database, and the standard data container has the size of 40 hex digits.

9. The method according to claim 1, in which the following information is stored in a separate database, in relation to the first set of data: the transaction hash corresponding to the transaction generated in the step e), the block hash, the block height and the block timestamp of registration, corresponding to the block mentioned in the step g).

10. A method for verifying data comprising the following steps:
- h1) providing a test digital file by a user, preferably through a web browser;
- i1) calculating the hash of the test digital file;
- j1) checking if the hash of the test digital file matches the first set of data being a hash of the digital file, previously stored in the block of the blockchain database as the result of the method according to claim 3, and in the affirmative sending confirmation to the user, preferably through the web browser, said confirmation comprising information relating to the contents of the test digital file and optionally comprising information relating to the origin of the test digital file and/or information relating to the timestamp of registration of the block.

11. A method for verifying data comprising the following steps:
- h2) providing a test digital file by a user, preferably through a web browser;
- i2) calculating the hash of the test digital file;
- j2) checking if the hash of the test digital file matches the first set of data being a hash of the digital file, previously stored in said separate database as the result of the method according to claim 9, and in the affirmative sending confirmation to the user, preferably through the web browser, said confirmation comprising information relating to the contents of the test digital file and optionally comprising information relating to the origin of the test digital file and/or information relating to the block timestamp of registration.

12. The method according to claim 10, wherein if the hash of the test digital file matches more than one first sets of data in the step j1) or j2) respectively, then only information corresponding to the transaction bearing one selected timestamp of registration, preferably the oldest timestamp of registration is used as the basis to generate the confirmation to the user in the step j1) or j2) respectively.

13. A computer program product comprising program code stored on a non-transitory computer readable medium, said program code comprising computer instructions for performing the method according to claim 1.

* * * * *